US006246000B1

(12) United States Patent
Wehrmann et al.

(10) Patent No.: US 6,246,000 B1
(45) Date of Patent: Jun. 12, 2001

(54) ELECTRIC CONTACT ELEMENT

(75) Inventors: Johann Wehrmann, Stuttgart; Heinz Eisenschmid, Hirschlanden; Alexander Bareiss, Immenstadt, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/402,511

(22) PCT Filed: Dec. 28, 1998

(86) PCT No.: PCT/DE98/03800

§ 371 Date: Oct. 5, 1999

§ 102(e) Date: Oct. 5, 1999

(87) PCT Pub. No.: WO99/40650

PCT Pub. Date: Aug. 12, 1999

(30) Foreign Application Priority Data

Feb. 6, 1998 (DE) ........................................ 198 04 669

(51) Int. Cl.[7] .................................... H02G 15/02
(52) U.S. Cl. ....................................... 174/74 R; 174/77 R
(58) Field of Search ............................ 174/74 R, 77 R, 174/84 R, 91

(56) References Cited

U.S. PATENT DOCUMENTS 3,961,196 6/1976 Alexeev et al. .................. 250/385
4,210,510 7/1980 Grimes ........................... 204/195 S
4,266,992 5/1981 Agaisse .......................... 156/49
4,269,639 5/1981 Lewis ............................. 156/54
4,556,475 12/1985 Bayha et al. .................... 204/427
4,818,363 4/1989 Bayha et al. .................... 204/426
5,271,821 12/1993 Ogasawara et al. ............ 204/439
5,490,412 2/1996 Duce et al. ..................... 73/23.31
5,795,454 8/1998 Friese et al. ................... 204/424
5,928,494 7/1999 Kato et al. ..................... 205/781
5,999,081 12/1999 Hannigan et al. .............. 338/28

FOREIGN PATENT DOCUMENTS 195 23 911 1/1997 (DE) .
195 26 821 1/1997 (DE) .
0 071 534 2/1983 (EP) .
0 220 918 5/1987 (EP) .
2 143 162 2/1985 (GB) .
8-219902 8/1996 (JP) .

*Primary Examiner*—Dean A. Reichard
*Assistant Examiner*—William H. Mayo, III
(74) *Attorney, Agent, or Firm*—Kenyon & Kenyon

(57) ABSTRACT

A contact element, in particular for making electrical contact to a sensing element of a gas sensor. The contact element has at least one connecting conductor, guided in a metal-sheathed line and contacted to at least one flexible connecting line. A connecting point between the at least one connecting conductor and the at least one connecting line is arranged in a contact housing that allows sealed and temperature-resistance contacting. The contact housing has at least one connecting element that is immovably joined to the at least one connecting line and may be contacted to the at least one connecting conductor. The at least one connecting element is arranged with an interference fit and in a form locking manner in the contact housing. The contact housing is enclosed by a temperature-resistant protective sleeve, which is joined directly to the metal-sheathed line (20,22) and to the at least one connecting line (20, 22).

23 Claims, 2 Drawing Sheets

ELECTRIC CONTACT ELEMENT

FIELD OF THE INVENTION

The present invention relates to an electrical contact element.

BACKGROUND OF THE INVENTION

Sensing elements that are exposed to high temperatures and vibration loads, such as those that can occur, for example, within the exhaust system of motor vehicles, are known. The electrical supply leads to such sensing elements are exposed to considerable temperature stresses, that conventional cable insulation cannot withstand. In particular, the connecting points of the sensing elements to the electrical supply leads, and their insulating layers, must be effectively shielded against excessive temperatures. In lambda probes, for example, heat-resistant metal-sheathed lines, which must have a certain minimum length are usually used. Only beyond a specific distance from the heat-stressed measurement location can conventional cables take over the electrical connection to a downstream analysis unit.

The connecting point between the heat-resistant metal-sheathed line and the conventional cable line must, however, be configured so as to be completely sealed against external influences. Also any excessive length of the metal-sheathed line is problematic, and creates the risk of vibration breakage. The metal-sheathed line must therefore be as short as possible because of the vibration loads that occur, so that the requirements for the connecting point comprise not only sealing against environmental influences and moisture, but also the greatest possible temperature resistance.

Connections between a rigid metal-sheathed line and flexible cable lines that are injection-coated with plastic. Since, however, it is generally not possible with an injection-coated plastic sheath of this kind to create sealed connections between the metal-sheathed line and the insulated cable lines, additional measures, for example elastomer seals, are necessary. The volume of the connection and its mass and thus the moment of inertia increase as a result of these measures. This has a disadvantageous effect on the vibration resistance of the sheathed lines, thus subjecting them to a risk of breakage.

SUMMARY OF THE INVENTION

The object of the present invention is to create a sealed and temperature-resistant connection between a metal-sheathed line and flexible cable lines that has the lowest possible mass.

By way of the largely prefabricated contact elements, it is possible to create, in a rapid and economical manner, lightweight, temperature-resistant, and vibration-resistant electrical connections from heat-stressed sensing elements to wiring harnesses. Conventional connecting techniques such as crimping and snap-locking are used in this context. Because the electrical contacts are very well insulated from one another, there is no risk of shunts or short-circuits. Because of the geometrical configuration of the contact housing with centering aids and insertion aids, incorrect assembly is almost ruled out. Automatic assembly, for example using assembly robots, is thereby reliably guaranteed. The subsequent laser welding of the electrical contacts and an enveloping thin protective metal sleeve also permits rapid automatic assembly. A robust, durable connection that is secured against breakage and vibration, and shielded from heat and any type of environmental influence is also ensured.

An elastomer seal ensures sealed encapsulation of the connecting element that is also resistant to temperatures exceeding 200° C. Lastly, the extremely compact and lightweight design, which minimizes the metal-sheathed line's susceptibility to vibration or vibration-induced breakage, is particularly advantageous.

The contact housing of the contact element must be able to withstand relatively high temperatures, and for that purpose can be made, for example, from a thermosetting plastic or a ceramic material. These materials also have the advantages of high stiffness, high mechanical load-carrying capacity, and relatively unrestricted three-dimensional design freedom. The mechanical properties can be further improved by way of fiber reinforcements. The contour of the contact element can be cylindrical, but because of the unrestricted shaping freedom using the molding or injection molding method, it can also be of any other desired configuration, depending on the desired installation location or additional anchoring or immobilization.

For a stable and vibration-free mechanical and electrical connection between the electrical lines guided in the metal-sheathed line and the flexible cable lines leading to an analysis unit, the latter are joined to one another inside the contact housing by laser welding. As compared to conventional plug-in contacts, these connections exhibit much greater long-term durability and thus better service life. Laser welding of the metal-sheathed line to a metal sleeve enclosing the contact housing practically rules out any penetration of moisture or other substances that might impair electrical insulation, even during a long operating period.

DETAILED DESCRIPTION OF THE DRAWINGS

Figure 1:
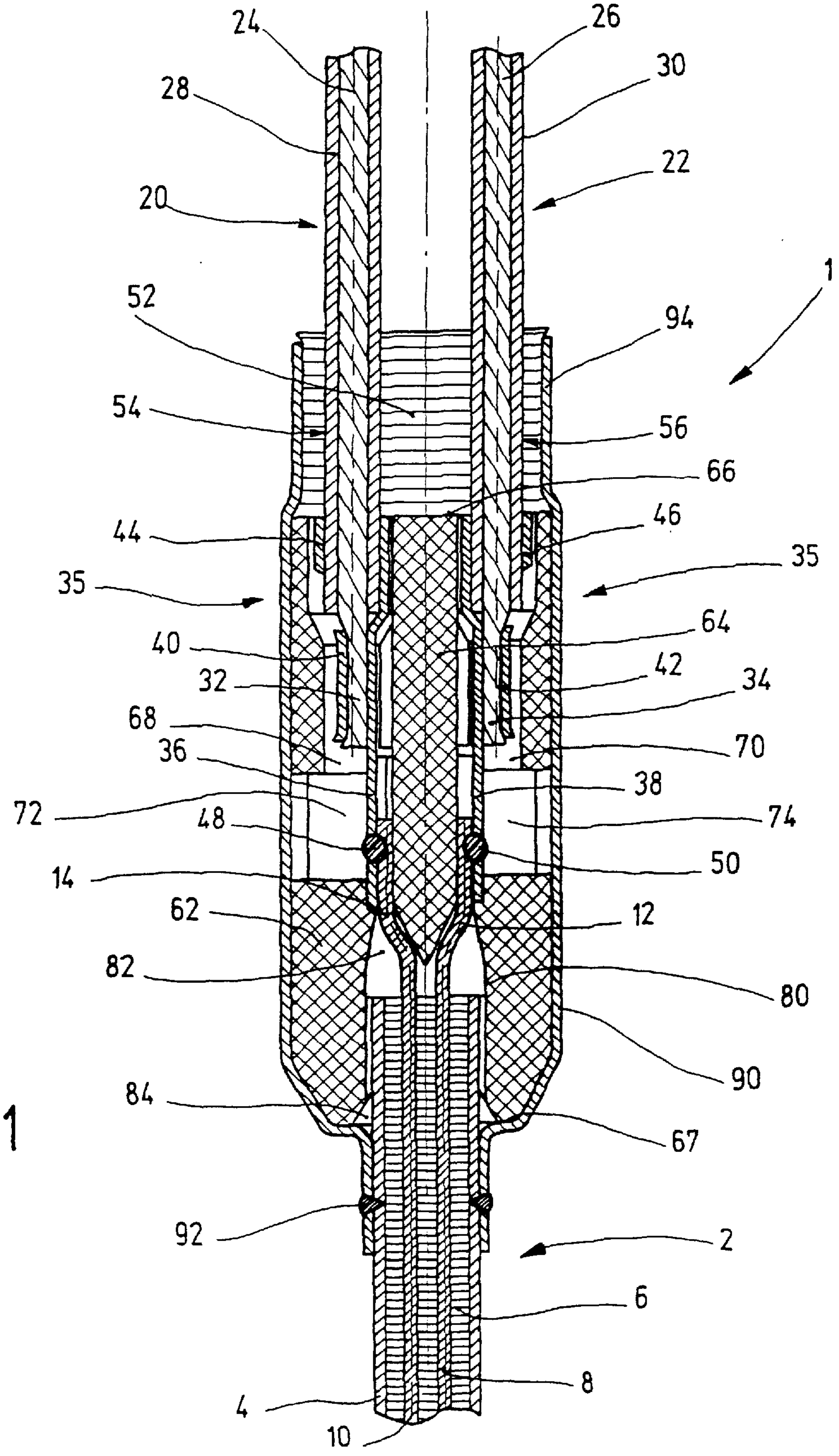
FIG. 1 shows a contact element in a sectioned view.

FIG. 1 shows, in an exemplary embodiment, a contact element 1 that can be used, in particular, for making electrical contact to a sensing element of a gas sensor with electrical supply leads. Contact element 1 essentially comprises a contact housing 62 with a preferably cylindrical outer contour, at least one connecting element 35 located therein, and a sealingly enclosing metal sleeve 90. On two end faces 66, 67 of contact housing 62, electrical lines 2, 20, 22 lead out of contact element 1 to a sensing element (not depicted here) and to an analysis unit (also not depicted here). Arranged inside contact housing 62 is at least one connecting element 35 that provides a stable electrical connection to lines 2, 20, 22.

A description is given below of an embodiment with two incoming and two outgoing electrical conductors that are connected inside contact element 1. Embodiments with only one or with more than two conductors are, however, also possible. With only one line, for example, a ground can be led in via metal housing parts. The electrical line arriving from the sensing element (not depicted here) of the gas sensor must be both vibration-resistant and temperature-resistant, since gas sensors of this kind are preferably used at measurement locations at which temperatures of more than 800° C. can exist, for example in the vicinity of a catalytic converter in an exhaust system of a motor vehicle. In the embodiment depicted, the stiff flexural electrical line 2 comprises two individual connecting conductors 8 and 10, insulated from one another, that can be embodied, for example, as wires or as braided or twisted strands of silver, copper, or other materials suitable as conductors. These connecting conductors 8 and 10 are enclosed by a metal-sheathed line 4 and are separated from one another by insulation. This insulation can be, for example, a ceramic powder insulator 6 or a temperature-resistant insulator of some other kind. A ceramic powder insulator 6 of this kind has, in addition to the desired insulating effect, the favorable property of damping vibrations and thus to reducing the risk of breakage of line 2 due to shock, sudden impact, or vibrations. In order further to reduce such risks, the free length of line 2 as a connection between the sensing element and contact element 1 is made as short as possible, the minimum length is defined by the maximum temperature resistance of contact element 1 and of the sealing elements made of elastomeric material located therein.

Metal-sheathed line 4, with connecting conductors 8 and 10 that lead out therefrom and are preferably configured as round, oval, or flat contact lugs 12 and 14, opens into a matching opening 80 in contact housing 62. This opening 80 is located centrally in one end face 67 of contact housing 62, and has a chamfer 84 for better and easier insertion of metal-sheathed line 4. This chamfer 84 can, for example, have a bevel of 15 degrees or more. The depth of chamfer 84 is advantageously selected so that it represents more than 5% of the diameter of opening 80 in order to constitute an effective insertion aid. At a specific distance from end surface 67 that, for example, can correspond to the diameter of opening 80, opening 80 has a constriction 82 that acts as a stop for metal-sheathed line 4. This constriction 82 acts at the same time as a guide for contact lugs 12 and 14 which preferably are bent slightly outward prior to insertion, so that as metal-sheathed line 4 is inserted they can be pushed into a defined position in contact housing 62. Also provided, for exact guidance of these contact lugs 12 and 14 into their final position, is a central wedge 64 with which contact lugs 12 and 14 are deflected apart as metal-sheathed line 4 is inserted.

Provided for each of the at least one connecting lines 20, 22, at an end face 66 of contact housing 62 located opposite end surface 67, is a round or rectangular receptacle 68, 70 in each of which a connecting element 35 is installed with an interference fit and in a form locking manner. Connecting element 35, which is made, for example, of metal, overlaps one of contact lugs 12, 14 with a preferably flat end 36, 38, and has at the other end a receptacle for a connecting line 20, 22 which can retain the latter by clamping or crimping and at the same time can create an electrical contact. Electrical connecting lines 20, 22 comprise a core 24, 26, made for example of copper wire or silver wire, and a respective insulating casing 28, 30. Contact elements 35, which resemble a cable lug, possess an elongated contour and each have two open rings 40, 42 and 44, 46 that can each be squeezed together in order to embrace a stripped end 32, 34 of electrical lines 20, 22. Rings 40, 42 in a central region of contact element 35 have a diameter suitable for receiving a core 24, 26 of lines 20, 22. The separately squeezable rings 44, 46 have a diameter suitable for receiving core 24, 26 together with insulating casing 28, 30 of lines 20, 22.

Resting flush against the flat end face 66 of contact housing 62 is a cylindrical sealing element whose outside diameter corresponds approximately to that of contact housing 62 or is slightly larger. This sealing element is preferably embodied as elastomer nipple 52, and has for each of the at least one connecting lines 20, 22 a leadthrough 54, 56 that corresponds exactly to the outside diameter of connecting lines 20, 22.

Contact lugs 12, 14 of connecting conductors 8, 10 are connected to the corresponding contacts 36, 38 of connecting elements 35, preferably by laser welding. These weld points are labeled here as connecting points 48, 50. To make these connecting points 48, 50 accessible from outside, contact housing 62 has corresponding radial apertures 72, 74 that can be of circular or oval configuration.

A protective sleeve 90 that preferably is made of metal is provided in order to seal off contact housing 62, with the electrical connections, from the outside in sealing and heat-resistant fashion. The contour of this protective sleeve 90 corresponds to the outer contour of contact housing 62, so that after laser welding of connecting points 48, 50, it can be slid axially over contact housing 62 in the direction of end face 67. Protective sleeve 90 is constricted at an end facing toward end face 67, specifically the side facing toward connecting line 2 and metal-sheathed line 4, so that at this point its inside diameter approximately equals the outside diameter of metal-sheathed line 4. As soon as protective sleeve 90 has been slid over contact housing 62 and comes to a stop, it can be sealingly joined to metal-sheathed line 4 by laser welding. This continuous annular weld is illustrated by contact point 92. Protective sleeve 90 is of correspondingly longer configuration than contact housing 62, so that it additionally fits around elastomer nipple 52 over its entire length. By compressing or edging over protective sleeve 90 to a smaller diameter 94 over the entire length of elastomer nipple 52, the latter is compressed and completely seals the interior of contact housing 62 from the outside. Elastomer nipple 52 is preferably made from a heat-resistant material, for example silicone, Viton, Kalrez, or the like. Insulators 28, 30 of lines 20, 22 are also preferably made of temperature-resistant material, since lines 20, 22 are located in a thermally affected zone in which very high temperatures can occur.

Figure 2A:
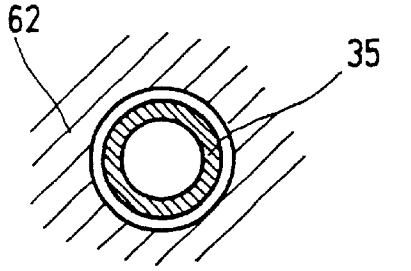
FIG. 2*a* shows a first plan view of a connecting element after insertion into a contact housing.
Figure 2B:
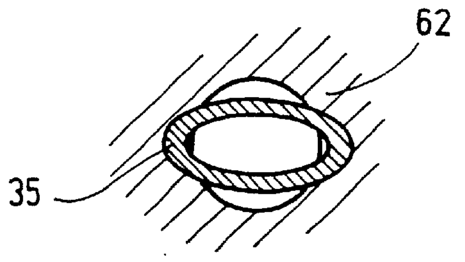
FIG. 2*b* shows a plan view of a connecting element shown in FIG. 2*a* after flattening into an oval contour.
Figure 2C:
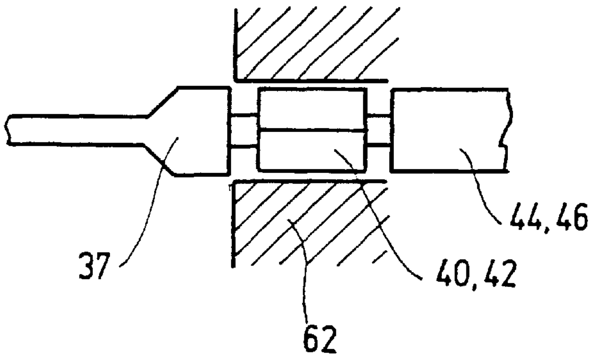
FIG. 2*c* shows a side view of the connecting element shown in FIG. 2*a*.
Figure 2D:
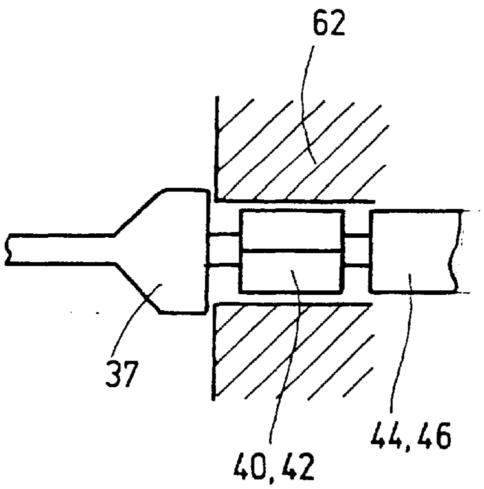
FIG. 2*d* shows a side view of the connecting element shown in FIG. 2*b* after flattening.
Figure 2E:
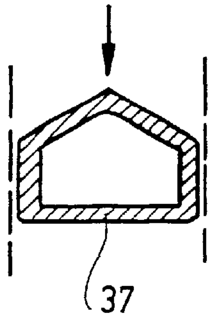
FIG. 2*e* shows a second plan view of a connecting element after insertion into a contact housing.
Figure 2F:
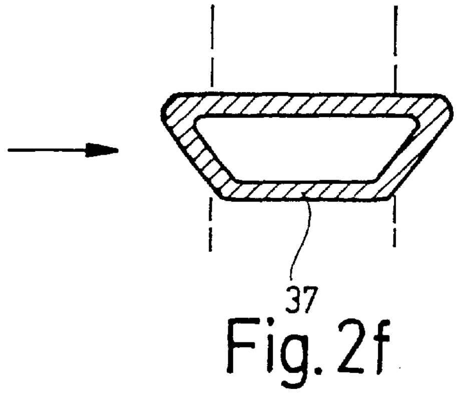
FIG. 2*f* shows a plan view of the connecting element shown in FIG. 2*e* after flattening into a trapezoidal contour.

FIGS. 2*a* through 2*f* show several side views (2*c*, 2*d*) and plan views (2*a*, 2*b*, 2*e*, 2*f*) of a connecting element 35 that is immobilized in contact housing 62 and that, for example after insertion into contact housing 62, can be pinched in such a way that it is impossible to pull out. After insertion, it is possible to create from a circular contour of one of rings 40, 42, 44, 46, or also of an additional ring 37 (FIG. 2*a*) that is not used to clamp a line 20, 22 or a core 32, 34, for example an oval (FIG. 2*b*) or a trapezoidal contour (FIG. 2*f*). Connecting element 35 is thus immobilized in its position and can no longer be pulled out.

FIG. 2*a* shows connecting element 35 after insertion, in plan view. FIG. 2*b* shows a connecting element 35 with an ovally pressed contour that is thus protected from being pulled out of contact housing 62. FIGS. 2*c* and 2*d* show corresponding side views. This compression can preferably be accomplished through radial housing openings 72, 74, through which joining by way of laser welding is subsequently also accomplished. FIGS. 2*e* and 2*f* show an alternative contour after insertion (FIG. 2*e*) and after pinching (FIG. 2*f*), with a trapezoidal contour.

What is claimed is:

1. A contact element for making electrical contact to a sensing element of a gas sensor, comprising:

at least one connecting conductor guided in a metal-sheathed line;

at least one flexible connecting line contacting the at least one connecting conductor at a connecting point; and a contact housing allowing sealed and temperature-resistant contact between the at least one connecting conductor and the at least one connecting line, the connecting point being situated in the contact housing, the contact housing including:

at least one connecting element situated in the contact housing in a form-locking manner and with an interference fit, the at least one connecting element contacting the at least one connecting conductor and being immovably joined to the at least one connecting line, and a temperature-resistant protective sleeve enclosing the contact housing, the protective sleeve being joined directly to the metal-sheathed line and the at least one connecting line.

2. The contact element according to claim 1, wherein the contact housing is made of a temperature-resistant, electrically insulating, and mechanically stiff material.

3. The contact element according to claim 2, wherein the temperature-resistant, electrically insulating, and mechanically stiff material includes ceramic materials.

4. The contact element according to claim 2, wherein the temperature-resistant, electrically insulating, and mechanically stiff material includes thermosetting plastic.

5. The contact element according to claim 1, wherein the contact housing further includes a recess for each of the at least one connecting element, the recess being located in a longitudinally extending direction of the contact housing.

6. The contact element according to claim 5, wherein the contact housing has a substantially cylindrical outer contour.

7. The contact element according to claim 1, wherein the protective sleeve is made of a weldable metal.

8. The contact element according to claim 7, wherein the protective sleeve surrounds the contact housing in a flush manner.

9. The contact element according to claim 8, wherein the protective sleeve has an outer contour that tapers at a side facing toward the metal-sheathed line, the outer contour tapering so that the protective sleeve fits flush around the metal-sheathed line.

10. The contact element according to claim 9, wherein the protective sleeve is sealingly joined to the metal-sheathed line.

11. The contact element according to claim 10, wherein the protective sleeve is joined to the metal-sheathed line via a continuous laser weld.

12. The contact element according to claim 1, wherein the contact housing further includes a substantially cylindrical elastomer nipple, the elastomer nipple being arranged coaxially with the contact housing and terminating flush with a first end face of the contact housing.

13. The contact element according to claim 12, wherein the elastomer nipple has a leadthrough for each of the at least one connecting line, the lead through enclosing the at least one connecting line in a flush manner.

14. The contact element according to claim 13, wherein the protective sleeve encloses the elastomer nipple, the elastomer nipple resting flush against the first end face of the contact housing.

15. The contact element according to claim 14, wherein the elastomer nipple is made of a heat resistant material.

16. The contact element according to claim 15, wherein the heat resistant material includes at least one of silicone, Viton, and Kalrez.

17. The contact element according to claim 13, wherein the elastomer nipple is crimped by the protective sleeve, the protective sleeve enclosing and compressing the elastomer nipple.

18. The contact element according to claim 12, wherein the contact housing further includes a central opening on a second end face opposite the first end face, the central opening having a diameter corresponding to a second diameter of the metal-sheathed line.

19. The contact element according to claim 18, wherein the central opening includes a chamfer.

20. The contact element according to claim 19, wherein the central opening has a conical construction, the conical construction being axially spaced away from the chamfer.

21. The contact element according to claim 1, wherein the at least one connecting conductor includes a contact lug.

22. The contact element according to claim 21, wherein the at least one connecting element has a flat end overlapping the contact lug, the contact lug being laser welded to the flat end.

23. The contact element according to claim 22, wherein the contact housing has a radial aperture situated at each connecting point for the contact lug and the flat end.

* * * * *